(12) United States Patent
Henry et al.

(10) Patent No.: US 10,018,739 B1
(45) Date of Patent: Jul. 10, 2018

(54) CURVED VACUUM CASSETTE ASSEMBLY FOR IMAGING APPLICATIONS

(71) Applicant: Consolidated Nuclear Security, LLC, Oak Ridge, TN (US)

(72) Inventors: Nathaniel F. Henry, Clinton, TN (US); Alexander K. Moses, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 0 days.

(21) Appl. No.: 15/443,403

(22) Filed: Feb. 27, 2017

(51) Int. Cl.
*G01T 7/00* (2006.01)
*G01T 1/16* (2006.01)

(52) U.S. Cl.
CPC . *G01T 7/00* (2013.01); *G01T 1/16* (2013.01)

(58) Field of Classification Search
CPC .................................. G01T 1/16; G01T 7/00
See application file for complete search history.

(56) References Cited

U.S. PATENT DOCUMENTS

| | | | |
|---|---|---|---|
| 2,357,969 A | 9/1944 | Powers | |
| 3,412,244 A | 11/1968 | Sherwood | |
| 3,703,272 A | 11/1972 | Lareau | |
| 3,846,635 A * | 11/1974 | Shaffer | G03B 42/04 378/166 |
| 3,884,818 A | 5/1975 | Tomita et al. | |
| 4,081,686 A | 3/1978 | Nieuweboer | |
| 4,251,731 A | 2/1981 | Bauer | |
| 5,388,140 A | 2/1995 | Robertson | |

* cited by examiner

*Primary Examiner* — Mark R Gaworecki
(74) *Attorney, Agent, or Firm* — Clements Bernard Walker PLLC; Christopher L. Bernard

(57) ABSTRACT

A curved vacuum cassette assembly including a rigid or semi-rigid curved structural backing that is porous or semi-porous to air flow such that one or more imaging detectors (e.g. film layers or CR plates), intensifying screens, and/or other layers may be affixed to the curved structural backing in a secure and conformal manner when a vacuum is applied to the structural backing. All of these structures are encapsulated within an airtight barrier and, optionally, another suitable rigid or semi-rigid housing.

12 Claims, 2 Drawing Sheets

CURVED VACUUM CASSETTE ASSEMBLY FOR IMAGING APPLICATIONS

STATEMENT REGARDING FEDERALLY SPONSORED RESEARCH OR DEVELOPMENT

The U.S. Government has rights to the present disclosure pursuant to Contract No. DE-NA0001942 between the U.S. Department of Energy and Consolidated Nuclear Security, LLC.

FIELD OF THE INVENTION

The present invention relates generally to imaging applications. More specifically, the present invention relates to a curved vacuum cassette assembly for imaging applications. The curved vacuum cassette assembly includes a rigid or semi-rigid curved structural backing that is porous or semi-porous to air flow such that one or more imaging detectors (e.g. film layers or computed radiography (CR) plates), intensifying screens, and/or other layers may be affixed to the curved structural backing in a secure and conformal manner when a vacuum is applied to the structural backing. All of these structures are encapsulated within an airtight barrier and, optionally, another suitable rigid or semi-rigid housing.

BACKGROUND OF THE INVENTION

The use of vacuum cassette technology in imaging applications has been proven to increase radiographic resolution. In addition to increased radiographic resolution, vacuum cassette technology may reduce the amount of radiation required to achieve comparable radiographic image density and/or saturation. A variety of conventional vacuum cassette assemblies are known to those of ordinary skill in the art, typically consisting of one or more imaging detectors (e.g. film layers or CR plates), intensifying screens, and/or other layers disposed in an airtight barrier.

In various applications, it is problematic to utilize a flat cassette assembly to image a curved part. Thus, a variety of conventional curved cassette assemblies are also known to those of ordinary skill in the art, typically consisting of one or more imaging detectors (e.g. film layers or CR plates), intensifying screens, and/or other layers disposed in a rigid or semi-rigid metallic, carbon fiber, or plastic housing. To date, however, there are no adequate curved vacuum cassette assemblies known to those of ordinary skill in the art, especially none that are effective, yet still easy to load and unload.

Thus, what is still needed in the art is a curved vacuum cassette assembly that increases radiographic resolution when imaging a curved part (e.g. in film and CR applications) that is still easy to load and unload. The design should allow air pressure outside the airtight barrier to apply force to the one or more imaging detectors (e.g. film layers or CR plates), intensifying screens, and/or other layers disposed therein, while maintaining structural integrity for loading and unloading, as with conventional flat and curved cassette assemblies that utilize a rigid or semi-rigid metallic, carbon fiber, plastic, or other suitable housing. This air pressure force would cause more intimate contact between the one or more imaging detectors (e.g. film layers or CR plates), intensifying screens, and/or other layers, thereby increasing the radiographic resolution.

BRIEF SUMMARY OF THE INVENTION

In various exemplary embodiments, the present invention provides a curved vacuum cassette assembly that includes a rigid or semi-rigid curved structural backing that is porous or semi-porous to air flow such that one or more imaging detectors (e.g. film layers or CR plates), intensifying screens, and/or other layers may be affixed to the curved structural backing in a secure and conformal manner when a vacuum is applied to the structural backing. All of these structures are encapsulated within an airtight barrier and, optionally, another suitable rigid or semi-rigid housing.

In one exemplary embodiment, the present invention provides a vacuum cassette for imaging applications, including: a structural backing, wherein the structural backing defines one or more fluid flow conduits through which a gas flows and a vacuum is created; one or more imaging detectors, intensifying screens, and/or other layers disposed adjacent to the structural backing and secured to the structural backing, and to one another, in a conformal manner by the vacuum; an airtight barrier disposed about the structural backing and the one or more imaging detectors, intensifying screens, and/or other layers disposed adjacent to the structural backing; a coupling device disposed through the airtight barrier in a sealed manner and in fluid communication with the structural backing; and a vacuum source coupled to the coupling device and operable for withdrawing gas from and evacuating the airtight barrier about the structural backing and the one or more imaging detectors, intensifying screens, and/or other layers disposed adjacent to the structural backing through the structural backing. The structural backing includes one of a rigid and a semi-rigid material and the airtight barrier includes a flexible material. Optionally, the structural backing is formed by an additive manufacturing technique. Optionally, the structural backing includes one or more flat surfaces in one or more orthogonal directions. Optionally, the structural backing includes one or more curved surfaces in one or more orthogonal directions. Optionally, the airtight barrier includes a resealable closure through which the structural backing and the one or more imaging detectors, intensifying screens, and/or other layers disposed adjacent to the structural backing are disposed within the airtight barrier.

In another exemplary embodiment, the present invention provides a method for providing a vacuum cassette for imaging applications, including: providing a structural backing, wherein the structural backing defines one or more fluid flow conduits through which a gas flows and a vacuum is created; providing one or more imaging detectors, intensifying screens, and/or other layers disposed adjacent to the structural backing and secured to the structural backing, and one another, in a conformal manner by the vacuum; providing an airtight barrier disposed about the structural backing and the one or more imaging detectors, intensifying screens, and/or other layers disposed adjacent to the structural backing; providing a coupling device disposed through the airtight barrier in a sealed manner and in fluid communication with the structural backing; and providing a vacuum source coupled to the coupling device and operable for withdrawing gas from and evacuating the airtight barrier about the structural backing and the one or more imaging detectors, intensifying screens, and/or other layers disposed adjacent to the structural backing through the structural backing. The structural backing includes one of a rigid and a semi-rigid material and the airtight barrier includes a flexible material. Optionally, the structural backing is formed by an additive manufacturing technique. Optionally, the structural backing includes one or more flat surfaces in one or more orthogonal directions. Optionally, the structural backing includes one or more curved surfaces in one or more orthogonal directions. Optionally, the airtight barrier includes a resealable closure through which the structural backing and the one or more imaging detectors, intensifying screens, and/or other layers disposed adjacent to the structural backing are disposed within the airtight barrier.

In a further exemplary embodiment, the present invention provides an imaging system including a vacuum cassette, the vacuum cassette including: a structural backing, wherein the structural backing defines one or more fluid flow conduits through which a gas flows and a vacuum is created; one or more imaging detectors, intensifying screens, and/or other layers disposed adjacent to the structural backing and secured to the structural backing, and one another, in a conformal manner by the vacuum; an airtight barrier disposed about the structural backing and the one or more imaging detectors, intensifying screens, and/or other layers disposed adjacent to the structural backing; a coupling device disposed through the airtight barrier in a sealed manner and in fluid communication with the structural backing; and a vacuum source coupled to the coupling device and operable for withdrawing gas from and evacuating the airtight barrier about the structural backing and the one or more imaging detectors, intensifying screens, and/or other layers disposed adjacent to the structural backing through the structural backing. The structural backing includes one of a rigid and a semi-rigid material and the airtight barrier includes a flexible material. Optionally, the structural backing is formed by an additive manufacturing technique. Optionally, the structural backing includes one or more flat surfaces in one or more orthogonal directions. Optionally, the structural backing includes one or more curved surfaces in one or more orthogonal directions. Optionally, the airtight barrier includes a resealable closure through which the structural backing and the one or more imaging detectors, intensifying screens, and/or other layers disposed adjacent to the structural backing are disposed within the airtight barrier.

BRIEF DESCRIPTION OF THE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
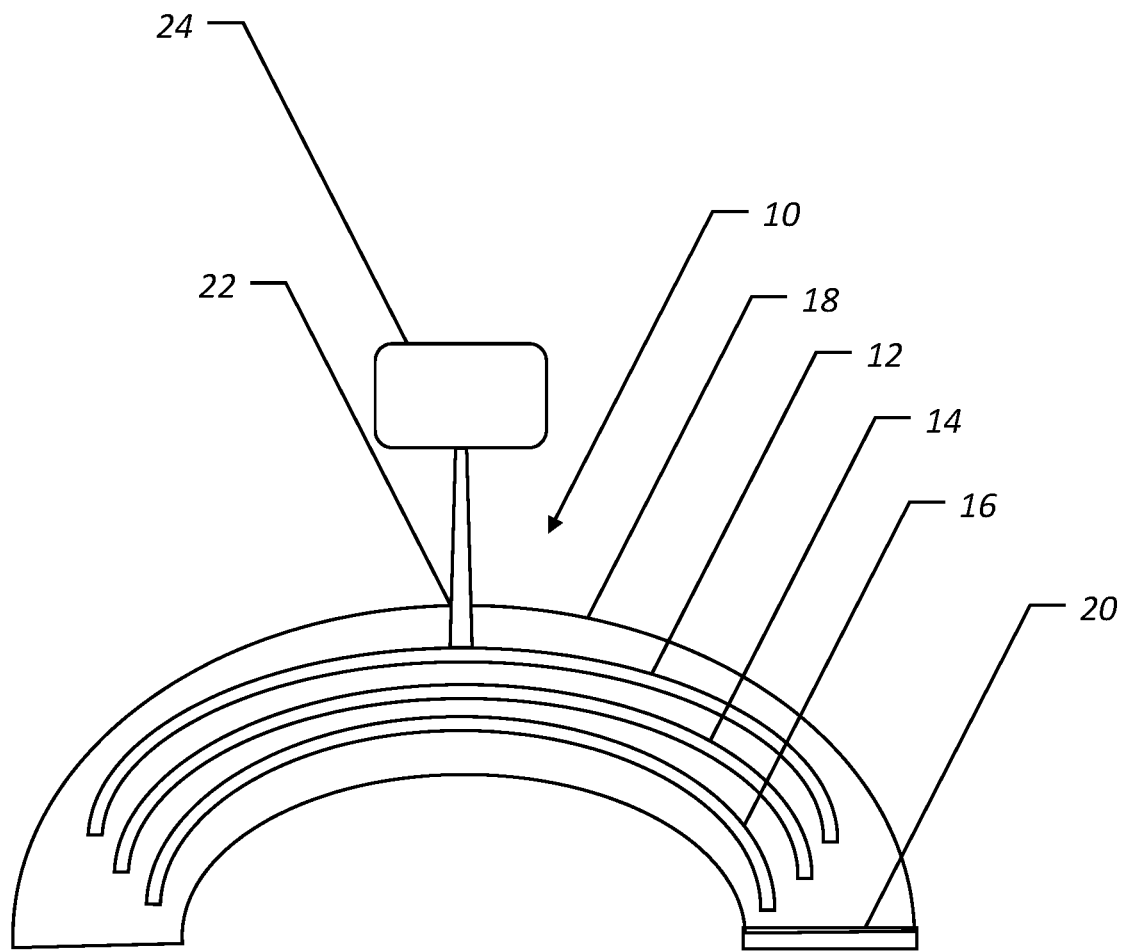
FIG. 1 is a schematic diagram conceptually illustrating one exemplary embodiment of the curved vacuum cassette assembly of the present invention.

Referring now specifically to FIG. 1, in one exemplary embodiment, the present invention provides a curved vacuum cassette assembly 10 for imaging applications. The curved vacuum cassette assembly 10 includes a rigid or semi-rigid curved structural backing 12 that is porous or semi-porous to air flow such that one or more imaging detectors 14 (e.g. film layers or CR plates), intensifying screens 16, and/or other layers may be affixed, in any order desired, to the curved structural backing 12 in a secure and conformal manner when a vacuum is applied to the structural backing 12. These other layers may include, for example, various grids, pads, paper layers, and/or other layers, without limitation. All of these structures are encapsulated within an airtight barrier 18 and, optionally, another suitable rigid or semi-rigid housing (not illustrated).

The structural backing 12 may be manufactured from, for example, expanded polyvinyl chloride (PVC), medium-density fiberboard (MDF), or the like, provided that one or more fluid flow paths or conduits are provided for the vacuum to reach substantially all of the surface of the given layer that is directly adjacent to the structural backing 12. As such, the desired porosity or permeability to fluid flow may also be provided by a manufacturing technique that creates a gas-permeable material, such as certain additive manufacturing or three-dimension (3-D) printing techniques. Preferably, the structural backing 12 is structurally solid, providing a substrate to which the other layers may be secured by the vacuum. The curvature of the structural backing 12 may vary from substantially zero to severe, up to the limits of the imaging detector material, and multiple (e.g. sinusoidal) and/or irregular curvatures may be utilized. Further, curvatures in multiple dimensions may be utilized, forming a plane that is variously curved in orthogonal directions.

The airtight barrier 18 is preferably flexible and, when evacuated, substantially conforms to the shape of the structures disposed therein. Accordingly the airtight barrier 18 may be made of, for example, plastic, PVC, vinyl, Mylar, rubber, or nylon. Preferably, the airtight barrier 18 takes the form of a resealable bag, including a "grip-type" seal 20 or the like, such that it is reusable in that its contents may be replaced.

A coupling device 22 is used to couple the vacuum from a vacuum source 24 to the structural backing 12, through the airtight barrier 18, such that the airtight barrier may selectively be evacuated. Accordingly, an appropriate airtight seal (not illustrated) is disposed about the coupling device 22 where it passes through the airtight barrier 18. The vacuum source 24 and coupling device 22, in conjunction with the airtight barrier 18 and structural backing 12, are collectively operable for allowing air pressure outside the airtight barrier 18 to be utilized to apply force to the one or more imaging detectors 14 (e.g. film layers or CR plates), intensifying screens 16, and/or other layers disposed therein, while maintaining structural integrity for loading and unloading, as with conventional flat and curved cassette assemblies that utilize a rigid or semi-rigid metallic, carbon fiber, or plastic housing. This force provides more intimate contact between the one or more imaging detectors 14 (e.g. film layers or CR plates), intensifying screens 16, and/or other layers, thereby increasing the radiographic resolution.

Figure 2:
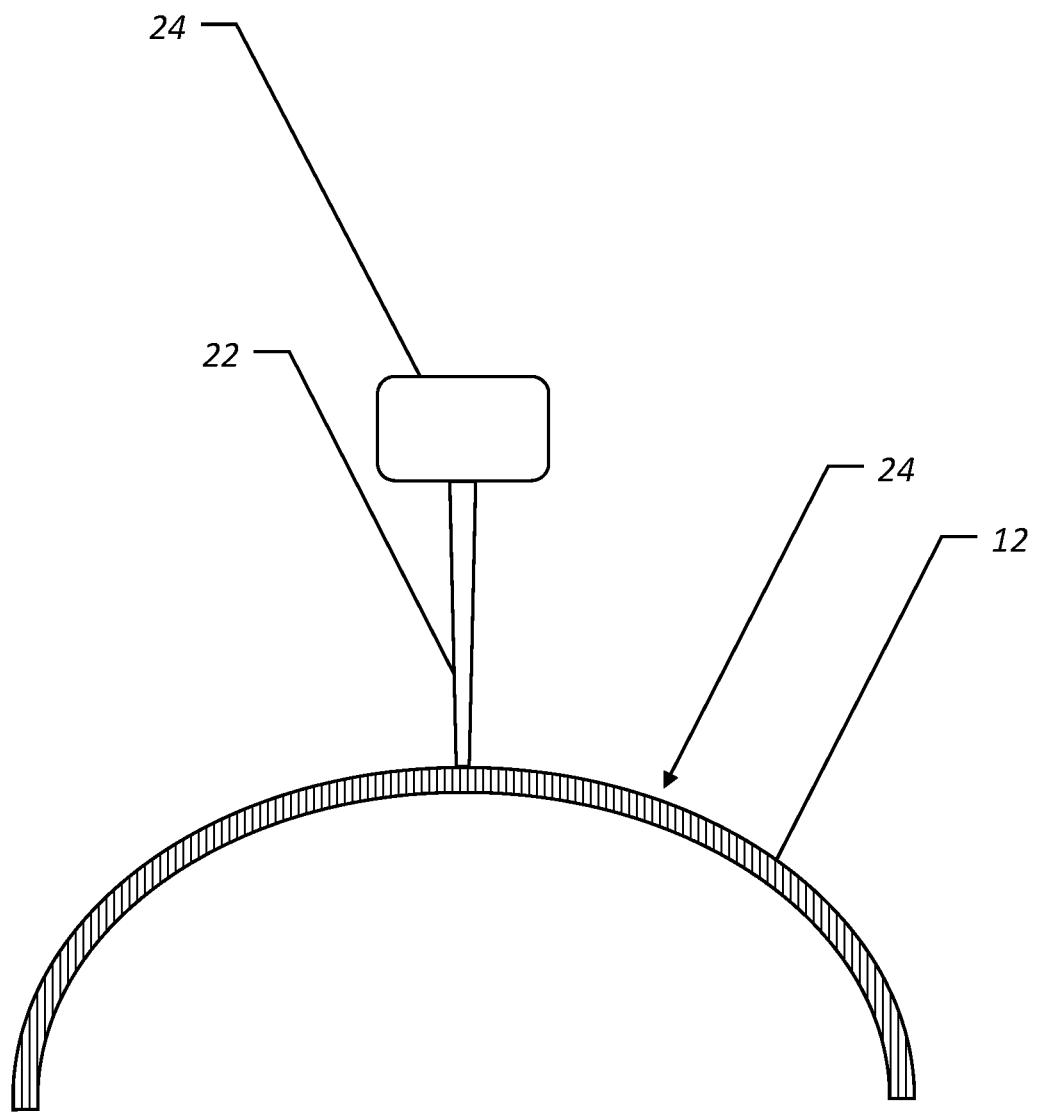
FIG. 2 is another schematic diagram conceptually illustrating one exemplary embodiment of the rigid or semi-rigid structural backing that is porous or semi-porous to air flow of the curved vacuum cassette assembly of the present invention.

Referring now specifically to FIG. 2, in one exemplary embodiment, the structural backing 12 may again be manufactured from, for example, expanded PVC, MDF, or the like, provided that one or more paths are provided for the vacuum to reach substantially all of the surface of the given layer that is directly adjacent to the structural backing 12. As such, the desired porosity may also be provided by a manufacturing technique that creates an air-permeable material, such as an additive manufacturing or three-dimension (3-D) printing technique. Preferably, the structural backing 12 is structurally solid, providing a substrate to which the other layers may be secured by the vacuum. The curvature of the structural backing 12 may vary from substantially zero to severe, up to the limits of the imaging detector material, and multiple (e.g. sinusoidal) and/or irregular curvatures may be utilized. Further, curvatures in multiple dimensions may be utilized, forming a plane that is variously curved in orthogonal directions. As illustrated, the structurally solid material of the structural backing 12 defines a plurality of fluid flow channels 24 through which gas can flow and a vacuum may be created between the vacuum source 24 and coupling device 22, within the airtight barrier 18 (FIG. 1), and the structural backing 12 and the given layer that is directly adjacent to the structural backing 12. In this manner, the given layer that is directly adjacent to the structural backing 12 is held securely in place, substantially conforming to the structural backing 12, and the airtight barrier 18 is "shrunk" around the structures enclosed therein.

The present invention is illustrated and described herein with reference to preferred embodiments and specific examples thereof. It will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A vacuum cassette for imaging applications, comprising:
    a structural backing, wherein the structural backing defines one or more fluid flow conduits through which a gas flows and a vacuum is created;
    one or more imaging detectors and intensifying screens disposed adjacent to the structural backing and secured to the structural backing, and one another, in a conformal manner by the vacuum;
    an airtight barrier disposed about the structural backing and the one or more imaging detectors and intensifying screens disposed adjacent to the structural backing;
    a coupling device disposed through the airtight barrier in a sealed manner and in fluid communication with the structural backing; and
    a vacuum source coupled to the coupling device and operable for withdrawing gas from and evacuating the airtight barrier about the structural backing and the one or more imaging detectors and intensifying screens disposed adjacent to the structural backing through the structural backing.

2. The vacuum cassette of claim 1, wherein the structural backing comprises one of a rigid and a semi-rigid material and the airtight barrier comprises a flexible material.

3. The vacuum cassette of claim 1, wherein the structural backing is formed by an additive manufacturing technique.

4. The vacuum cassette of claim 1, wherein the structural backing comprises one or more flat surfaces in one or more orthogonal directions.

5. The vacuum cassette of claim 1, wherein the structural backing comprises one or more curved surfaces in one or more orthogonal directions.

6. The vacuum cassette of claim 1, wherein the airtight barrier comprises a resealable closure through which the structural backing and the one or more imaging detectors and intensifying screens disposed adjacent to the structural backing are disposed within the airtight barrier.

7. A method for providing a vacuum cassette for imaging applications, comprising:
    providing a structural backing, wherein the structural backing defines one or more fluid flow conduits through which a gas flows and a vacuum is created;
    providing one or more imaging detectors and intensifying screens disposed adjacent to the structural backing and secured to the structural backing, and one another, in a conformal manner by the vacuum;
    providing an airtight barrier disposed about the structural backing and the one or more imaging detectors and intensifying screens disposed adjacent to the structural backing;
    providing a coupling device disposed through the airtight barrier in a sealed manner and in fluid communication with the structural backing; and
    providing a vacuum source coupled to the coupling device and operable for withdrawing gas from and evacuating the airtight barrier about the structural backing and the one or more imaging detectors and intensifying screens disposed adjacent to the structural backing through the structural backing.

8. The method for providing a vacuum cassette of claim 7, wherein the structural backing comprises one of a rigid and a semi-rigid material and the airtight barrier comprises a flexible material.

9. The method for providing a vacuum cassette of claim 7, wherein the structural backing is formed by an additive manufacturing technique.

10. The method for providing a vacuum cassette of claim 7, wherein the structural backing comprises one or more flat surfaces in one or more orthogonal directions.

11. The method for providing a vacuum cassette of claim 7, wherein the structural backing comprises one or more curved surfaces in one or more orthogonal directions.

12. The method for providing a vacuum cassette of claim 7, wherein the airtight barrier comprises a resealable closure through which the structural backing and the one or more imaging detectors and intensifying screens disposed adjacent to the structural backing are disposed within the airtight barrier.

* * * * *